US006986393B1

(12) United States Patent
Johnston, Jr. et al.

(10) Patent No.: US 6,986,393 B1
(45) Date of Patent: Jan. 17, 2006

(54) TURF AERATOR CORE-CLEANING SYSTEMS

(76) Inventors: Donald F. Johnston, Jr., 7602 N. 175th Ave., Waddell, AZ (US) 85355; Andrew Johnston, 7602 N. 175th Ave., Waddell, AZ (US) 85355; Ian Johnston, 7602 N. 175th Ave., Waddell, AZ (US) 85355

( * ) Notice: Subject to any disclaimer, the term of this patent is extended or adjusted under 35 U.S.C. 154(b) by 0 days.

(21) Appl. No.: 10/993,691

(22) Filed: Nov. 19, 2004

Related U.S. Application Data (60) Provisional application No. 60/526,463, filed on Dec. 2, 2003.

(51) Int. Cl.
*A01B 45/00* (2006.01)
(52) U.S. Cl. .................. 172/21; 172/684.5; 56/16.6
(58) Field of Classification Search .................. 172/21, 172/22, 684.5; 56/16.4 R, 16.6, 16.4 A, 56/16.4 B; 298/17 R
See application file for complete search history.

(56) References Cited

U.S. PATENT DOCUMENTS

| | | | | |
|---|---|---|---|---|
| 976,811 A | * | 11/1910 | Kloss ........................ 171/86 |
| 1,291,594 A | * | 1/1919 | Monroe ................... 172/684.5 |
| 1,347,485 A | * | 7/1920 | Allyn ...................... 172/684.5 |
| 2,817,203 A | * | 12/1957 | Sievers et al. ........... 172/684.5 |
| 2,994,142 A | * | 8/1961 | Newell et al. ........... 172/445.1 |
| 3,739,857 A | * | 6/1973 | Little .......................... 172/22 |
| 3,795,069 A | * | 3/1974 | Cheney ....................... 37/219 |
| 3,797,578 A | * | 3/1974 | Velasquez .................... 172/22 |
| 5,069,293 A | | 12/1991 | St. Romain |
| 5,191,944 A | * | 3/1993 | Thorn ...................... 172/445.1 |
| 5,423,386 A | | 6/1995 | Lapearous |
| 5,974,703 A | * | 11/1999 | Cadarette ..................... 37/269 |
| 6,098,387 A | | 8/2000 | Pfisterer |
| 6,253,858 B1 | | 7/2001 | Warke |
| 2003/0155139 A1 | | 8/2003 | Pfisterer |

* cited by examiner

*Primary Examiner*—Thomas B. Will
*Assistant Examiner*—Alexandra Pechhold
(74) *Attorney, Agent, or Firm*—Stoneman Law Offices, Ltd.; Martin L. Stoneman (57) ABSTRACT

An aerator plug-core cleaning system for ground surface collection of turf cores extracted from a turf core-aerating apparatus. The core-cleaning system comprises a core-cleaner that primarily attaches to either a walk-behind or tractor pulled aerator machine. The core-cleaner entraps and pushes the extracted cores along behind the core-aeration machine until being lifted in about a vertical manner by secondary attachment to a rear raise-able portion of the core-aeration machine at which point the cores are left in a pile for disposal.

10 Claims, 4 Drawing Sheets

TURF AERATOR CORE-CLEANING SYSTEMS

CROSS-REFERENCE TO RELATED APPLICATION

The present application is related to and claims priority from prior provisional application Ser. No. 60/526,463, filed Dec. 2, 2003, entitled "TURF AERATOR CORE-CLEANING SYSTEM", the content of which is incorporated herein by this reference and is not admitted to be prior art with respect to the present invention by the mention in this cross-reference section.

BACKGROUND

This invention relates to providing improved turf aerator core-cleaning systems. Further, this invention relates to providing a system for improved collection of turf-cores extracted during the process of turf aeration. More specifically, this invention relates to the collection of turf-cores produced from the use of a turf-core aerating machine, most typically used on lawns, golf course greens and fairways.

Typically, golf course fairways and greens are aerated to provide a healthier more lush turf. Over time and with use, soils have a tendency to compact, especially those soils with higher clay content. Compact soils have less pore space and increased density, resulting in lower soil-oxygen levels as well as decreased water and nutrient movement. Compaction smothers turf, making it less tolerant to stress and more susceptible to weeds, insect infestation and disease. Most soil compaction problems in turf occur just below turf's surface, in the top three inches of soil. Compaction is especially prevalent in clay-based soils. Sandy or drier soils are more resistant to compaction. Core aeration removes a small core or "plug" of soil from the ground, leaving a hole in turf. In general, core aeration improves turf-growing conditions near the surface by loosening soil and reducing thatch. This is the typical choice for residential and commercial turf care.

There are multiple aerator machines available to perform such aeration, for example, core-aeration machines made by Ryan, John Deere and Toro companies.

Most typically, the core-aeration machine removes a cylindrical plug of turf and soil utilizing a series of mechanical core extractors, typically providing about six core removals per square foot with a typical depth of about three inches. The core-aeration machine may be self-propelled (known as a walk-behind) or pulled behind a secondary vehicle, typically a tractor.

In operation, the core-aeration machine moves (or is pulled) along the turf in a relatively straight line much like mowing. The core-aeration machine punches out cores of turf and the extracted cores typically are discharged behind the core-aeration machine. Typically, the cores are raked up into piles by hand and are hauled away for re-mulching. Such raking and hauling can be extremely time consuming and costly. For example, it typically takes nine to eleven workers from one to two days to aerate an eighteen (18) hole golf course green.

Therefore, a need exists for a core-cleaning machine accessory that easily collects and dispenses the turf-cores for collection.

OBJECTS AND FEATURES OF THE INVENTION

A primary object and feature of the present invention is to provide turf aerator core-cleaning systems to overcome the above-mentioned problems. A further primary object and feature of the present invention is to provide systems for easily collecting the extracted cores from a core-aeration machine.

It is a further object and feature of the present invention to provide such a system that adapts to the contours of the turf surface.

It is a further object and feature of the present invention to provide such a system that lifts the core-cleaner in about a vertical lift such that the extracted and collected cores are left in a pile when the core-cleaner is lifted.

It is a further object and feature of the present invention to provide such a system that is adapted to work on a variety of aeration machines both self-propelled and tractor pulled.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides an aerator plug-core cleaning system for ground surface collection of turf cores extracted from a turf core-aerating apparatus comprising, in combination: entrapper means for entrapping the turf cores; connector means for connecting such entrapment means to the turf core-aerating apparatus; and positioner means for assisting positioning such entrapper means in at least one lowered position and at least one raised position when connected to a raise-able portion of the turf core-aerating apparatus; wherein such entrapper means comprises pusher means for pushing the extracted turf cores across the ground surface; wherein positioning such entrapper means in such at least one lowered position assists entrapping the turf cores; and wherein positioning such entrapper means in such at least one raised position releases the turf cores in position.

Furthermore, it provides such an aerator plug-core cleaning system wherein such entrapper means is bottomless. Additionally, it provides such an aerator plug-core cleaning system wherein such positioner means comprises lifter means for assisting substantially vertical lifting of such entrapper means. Also, it provides such an aerator plug-core cleaning system wherein such pusher means comprises scraper means for scraping the ground surface. In addition, it provides such an aerator plug-core cleaning system wherein such entrapper means comprises funnel means for funneling the extracted cores into such entrapper means. And, it provides such an aerator plug-core cleaning system wherein such funnel means comprises friction reducer means for reducing the friction of such funnel means along the ground surface.

In accordance with another preferred embodiment hereof, this invention provides an aerator plug-core cleaning system for ground surface collection of turf cores extracted from a turf core-aerating apparatus comprising, in combination: at least one entrapper adapted to entrap the turf cores; at least one connector to connect such at least one entrapper to the turf core-aerating apparatus; and at least one positioner adapted to assist positioning such at least one entrapper in at least one lowered position and at least one raised position when connected to a raise-able portion of the turf core-aerating apparatus; wherein such at least one entrapper comprises at least one pusher to push the extracted turf cores across the ground surface; wherein positioning such at least one entrapper in such at least one lowered position assists entrapping the turf cores; and wherein positioning such at least one entrapper in such at least one raised position releases the turf cores in position.

Further, it provides such an aerator plug-core cleaning system wherein such at least one entrapper is bottomless. Even further, it provides such an aerator plug-core cleaning system wherein such at least one positioner comprises at least one lifter structured and arranged to assist substantially vertical lifting of such at least one entrapper. Moreover, it provides such an aerator plug-core cleaning system wherein such at least one pusher comprises at least one scraper adapted to scrape the ground surface. Additionally, it provides such an aerator plug-core cleaning system wherein such at least one entrapper comprises at least one funnel adapted to funnel the extracted cores into such at least one entrapper. Also, it provides such an aerator plug-core cleaning system wherein such at least one funnel comprises at least one friction reducer adapted to reduce the friction of such at least one funnel along the ground surface.

In accordance with another preferred embodiment hereof, this invention provides an aerator plug-core cleaning system wherein such at least one entrapper comprises: a substantially bottomless, generally U-shaped entrapper having at least one first side, at least one second side, at least one adjoining bar between such at least one first side and such at least one second side, at least one open side; wherein such at least one first side and such at least one second side are about perpendicular to such at least one adjoining bar. In addition, it provides such an aerator plug-core cleaning system wherein such at least one pusher comprises such at least one adjoining bar. And, it provides such an aerator plug-core cleaning system wherein such at least one connector comprises at least one substantially rigid bar, attachable to the turf core-aerating apparatus. Further, it provides such an aerator plug-core cleaning system wherein such at least one substantially rigid bar comprises at least two substantially rigid bars and each respective such rigid bar connects to a respective rear portion of the turf core-aerating apparatus.

Even further, it provides such an aerator plug-core cleaning system wherein such at least one lifter further comprises: at least two chains, each respective such at least two chains having at least one first end and at least one second end; wherein at least one first end of such at least two chains is connected to such at least one first side wherein at least one first end of such at least two chains is connected to such at least one second side; wherein when each respective such second end is connected to a raise-able portion of the core-aerator machine and such at least two chains will assist substantially vertical lifting of such at least one entrapper. Even further, it provides such an aerator plug-core cleaning system wherein such at least one friction reducer comprises at least one radiused edge to reduce friction along the ground surface.

In accordance with another preferred embodiment hereof, this invention provides an aerator plug-core cleaning system for ground surface collection of turf cores extracted from a turf core-aerating apparatus comprising, in combination: at least one entrapper adapted to entrap the turf cores; at least one connector to connect such at least one entrapper to the turf core-aerating apparatus; and at least one positioner adapted to assist positioning such at least one entrapper in at least one lowered position and at least one raised position when connected to a raise-able portion of the turf core-aerating apparatus; wherein such at least one entrapper comprises at least one pusher to push the extracted turf cores across the ground surface; wherein positioning such at least one entrapper in such at least one lowered position assists entrapping the turf cores; and wherein positioning such at least one entrapper in such at least one raised position releases the turf cores in position. Even further, it provides such an aerator plug-core cleaning system wherein such core-aerating apparatus is structured and arranged to be pulled by a tractor. Even further, it provides such an aerator plug-core cleaning system further comprising a tractor structured and arranged to pull the core-aerating apparatus.

In accordance with another preferred embodiment hereof, this invention provides each and every novel feature, element, combination, step and/or method disclosed or suggested by this provisional patent application.

DETAILED DESCRIPTION OF THE BEST MODES AND PREFERRED EMBODIMENTS OF THE INVENTION

Figure 1:
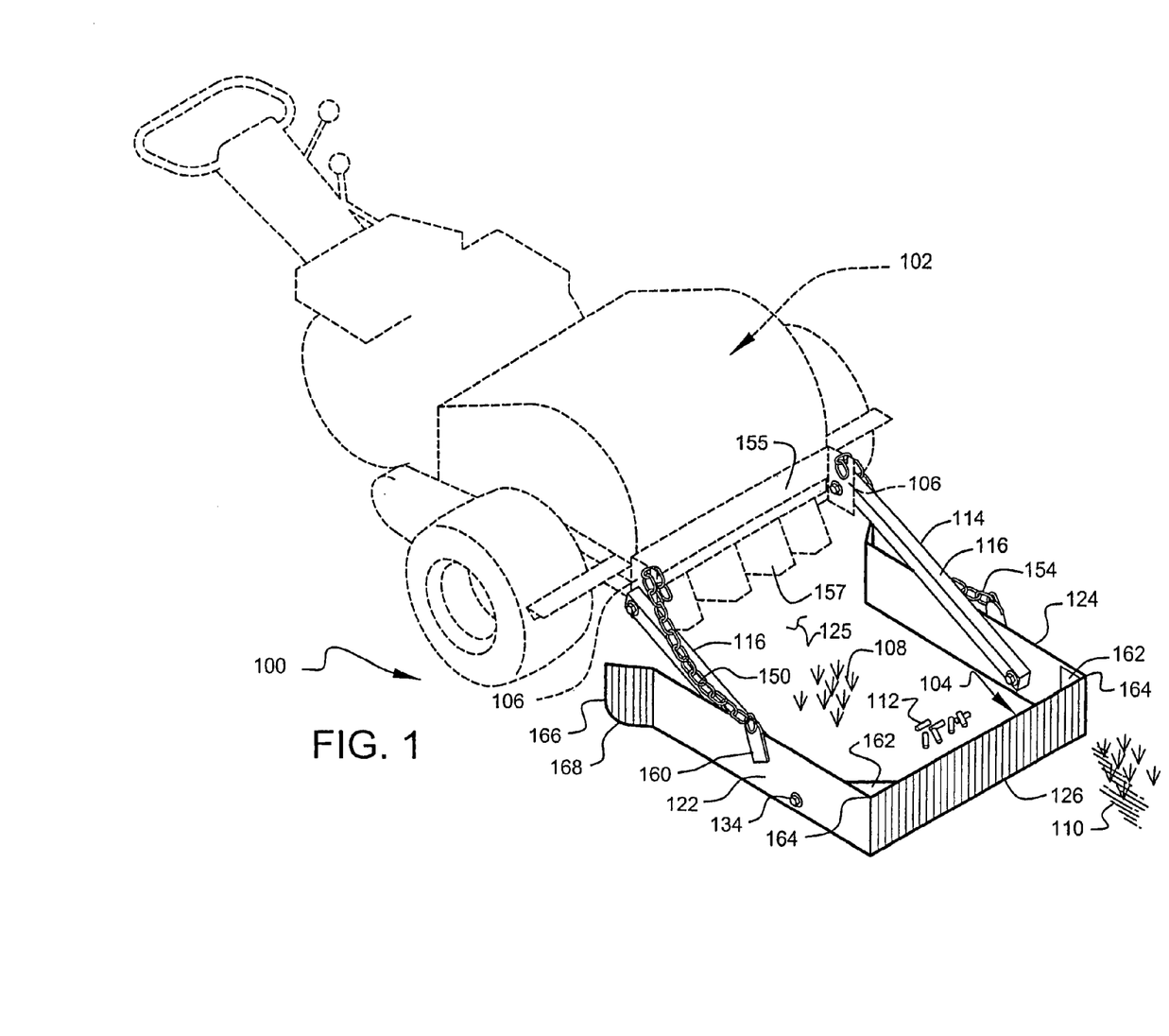
FIG. 1 shows a perspective view of an aerator core-cleaning system according to a preferred embodiment of the present invention.

FIG. 1 shows a perspective view of aerator core-cleaning system 100 according to a preferred embodiment of the present invention.

FIG. 1 further shows a core-aerator machine 102, (preferably a John Deere model number 800) with a core-cleaner 104 attached. Preferably, the core-cleaner 104 (at least embodying herein at least one entrapper adapted to entrap the turf cores; and at least embodying herein entrapper means for entrapping the turf cores) attaches to the core-aerator machine 102 to be pulled along behind the core-aerator machine 102 and entrap and push along the cores 112 extracted by the core-aerator machine 102, as shown. Upon reading the teachings of this specification, those with ordinary skill in the art will now understand that, under appropriate circumstances, considering such issues as advances in technology, user preference, etc., other arrangements, such as a core-cleaner that is not attached to a turf aerator, etc., may suffice.

Preferably, on the John Deere machine shown in FIG. 1, the core-cleaner 104 attaches to right angle brackets 106, typically referred to as "Winrow" blade brackets, that are normally available as an accessory with the John Deere model shown. As will be further explained below, different core-aerator machines may comprise different attachments for the core-cleaner 104 to attach to the core-aerator machine 102. Upon reading the teachings of this specification, those with ordinary skill in the art will now understand that, under appropriate circumstances, considering such issues as advances in technology, user preference, etc., other arrangements, such as core-cleaners attached to the sides of the core-aerator machine, custom attachment brackets, etc., may suffice.

Most preferably, the core-cleaner 104 attaches to the core-aerator machine 102 such that the core-cleaner 104 may be pulled along the ground/turf 108 closely adjacent the surface 110, as shown. Preferably, as the aerator machine 102 proceeds along the ground/turf 108, the extracted cores 112 are pushed along by the core-cleaner 104, as shown. Most preferably, the attachment 114 (at least embodying herein connector means for connecting such entrapment means to the turf core-aerating apparatus; and at least embodying herein at least one connector to connect such at least one entrapper to the turf core-aerating apparatus) comprises an arm assembly that allows the core-cleaner 104 to closely move along the surface 110 of the turf as the contour of the surface 110 changes. Preferably, the attachment 114 comprises a rigid arm 116 on each respective side 118 and 120 of the core-cleaner 104, as shown and further detailed below (at least embodying herein wherein such at least one connector comprises at least one substantially rigid bar, attachable to the turf core-aerating apparatus; and at least embodying herein wherein such at least one substantially rigid bar comprises at least two substantially rigid bars; and each respective such rigid bar connects to a respective rear portion of the turf core-aerating apparatus). Upon reading the teachings of this specification, those with ordinary skill in the art will now understand that, under appropriate circumstances, considering such issues as advances in technology, user preference, etc., other arm assemblies, such as a single arm, multiple arms, an articulated arm, other turf-contour following methods, etc., may suffice.

Figure 2:
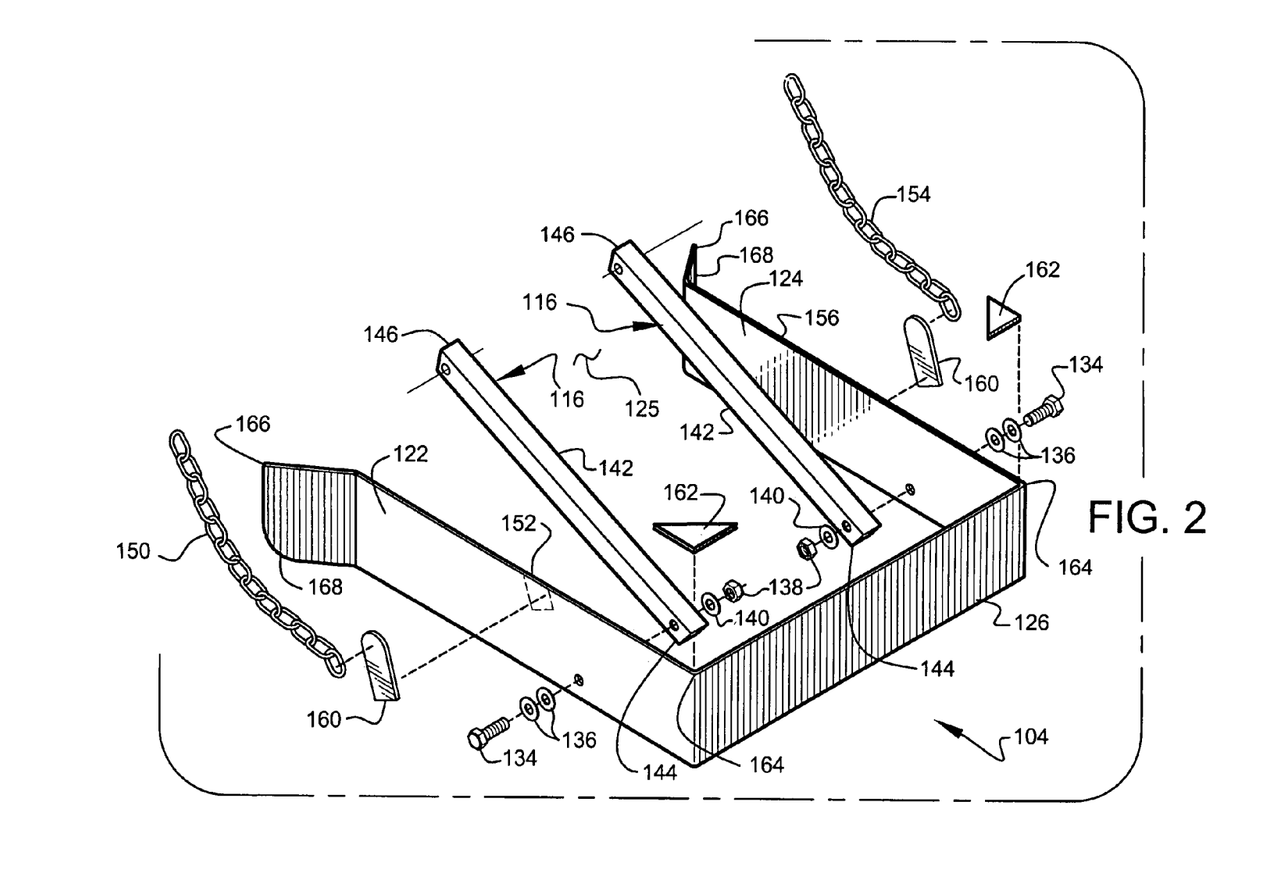
FIG. 2 shows an exploded perspective view of the core-cleaner of FIG. 1.

FIG. 2 shows an exploded perspective view of the core-cleaner 104 of FIG. 1. Preferably, the core-cleaner 104 further comprises a first lateral sidewall 122 (at least embodying herein at least one first side), a second lateral sidewall 124 (at least embodying herein at least one second side) and a rear lateral cross member 126 preferably integrally connected between the first lateral sidewall 122 and second lateral sidewall 124, as shown (at least embodying herein at least one adjoining bar between such at least one first side and such at least one second side). Preferably, there is one open side 125 opposite the rear lateral cross member 126, as shown (at least embodying herein at least one open side). Most preferably, the first lateral sidewall 122 and second lateral sidewall 124 are about perpendicular to the rear lateral cross member 126 such that they comprise about a U-shaped core-cleaner 104, as shown (this arrangement at least embodies herein wherein such at least one first side and such at least one second side are about perpendicular to such at least one adjoining bar). Preferably, the U-shaped core-cleaner is bottomless, as shown (at least embodying herein a substantially bottomless, generally U-shaped entrapper). Upon reading the teachings of this specification, those with ordinary skill in the art will now understand that, under appropriate circumstances, considering such issues as economics, user preference, design preference, etc., shapes other than a U-shape, such as V-shape, square-shape, rectangular-shape, half-circle shape, a bottom portion, etc., may suffice.

Preferably, the bottom inside edge 128 (shown in FIG. 3) of the lateral cross member 126 also acts as a scraper to assist in cleaning the extracted cores 112(shown in FIG. 3) from the surface 110 as the core-cleaner 104 moves across the extracted core areas, as shown (thereby collecting the extracted cores and scarifying the surface). Preferably, first lateral sidewall 122, second lateral sidewall 124 and rear lateral cross member 126 are made from heavy-gauge steel to provide additional weight to assist the scraping along the surface 110 and to provide a more sturdy material to reduce deflection of the first lateral sidewall 122, second lateral sidewall 124 and a rear lateral cross member 126 as they scrape along the surface 110. Upon reading the teachings of this specification, those with ordinary skill in the art will now understand that, under appropriate circumstances, considering such issues as economics, user preference, etc., other material selection, such as stainless steel, brass, wood, aluminum, plastics, etc., may suffice.

Preferably, a respective rigid arm 116 is connected to both the first lateral sidewall 122 and second lateral sidewall 124, as shown. Preferably, one end 144 of each respective rigid arm 116 is attached to the respective first lateral sidewall 122 and second lateral sidewall 124 along the inside portion 132, preferably closely adjacent the rear lateral cross member 126, of the respective first lateral sidewall 122 and second lateral sidewall 124, as shown. Preferably, each respective rigid arm 116 is attached to the respective first lateral sidewall 122 and second lateral sidewall 124 using bolts 134, washers 136, nuts 138 and locking washers 140, as shown. Preferably, each respective rigid arm 116 comprises a sturdy metal bar 142, preferably hollow metal to reduce unnecessary weight, preferably thick-wall two-inch square tubing. Preferably, a second end 146 of each respective rigid arm 116 is attached to the core-aerator machine 102, for example, onto the "Winrow" brackets, or other bolt-able areas, as shown. Upon reading the teachings of this specification, those with ordinary skill in the art will now understand that, under appropriate circumstances, considering such issues as economics, user preference, etc., other installation methods, bolting arrangements, material choices and dimensions, etc., such as those necessary to provide the needed strength for larger or smaller core-aerator machines, etc., may suffice.

Preferably, a positioning chain 150 is attached to the first lateral sidewall 122, preferably along the upper portion 152, preferably about the center of gravity of the core-cleaner 104, preferably weldably attached, as shown. Preferably, a positioning chain 154 is attached to the second lateral sidewall 124, preferably along the upper portion 156, preferably about the center of gravity of the core-cleaner 104, preferably weldably attached, as shown. Most preferably, each respective positioning chain 154 is welded to a respective steel plate 160 to facilitate a better-welded connection to the core-cleaner 104, as shown. Upon reading the teachings of this specification, those with ordinary skill in the art will now understand that, under appropriate circumstances, considering such issues as economics, user preference, material selection, etc., other attachments, such as mechanical attachments, etc., may suffice.

Further, upon reading the teachings of this specification, those with ordinary skill in the art will now understand that, under appropriate circumstances, considering such issues as economics, user preference, material availability, manufacturing preference, etc., materials other than a chain may be used for the positioning of the core-cleaner 104, such as a cable, an articulated bar, etc.

Figure 3:
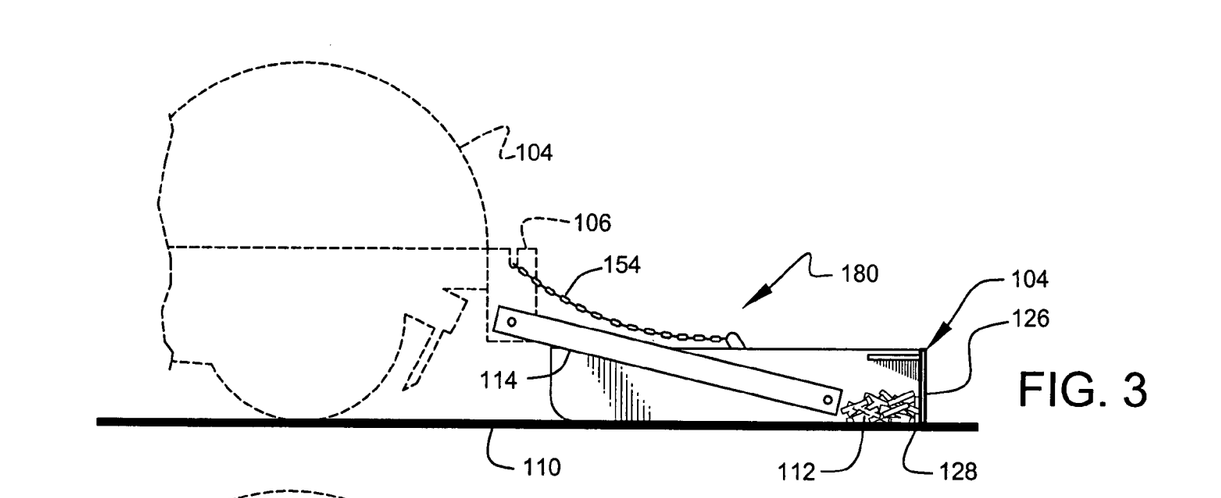
FIG. 3 shows a side view, partially in section, of the core-cleaner of FIG. 1 in an operable position.
Figure 4:
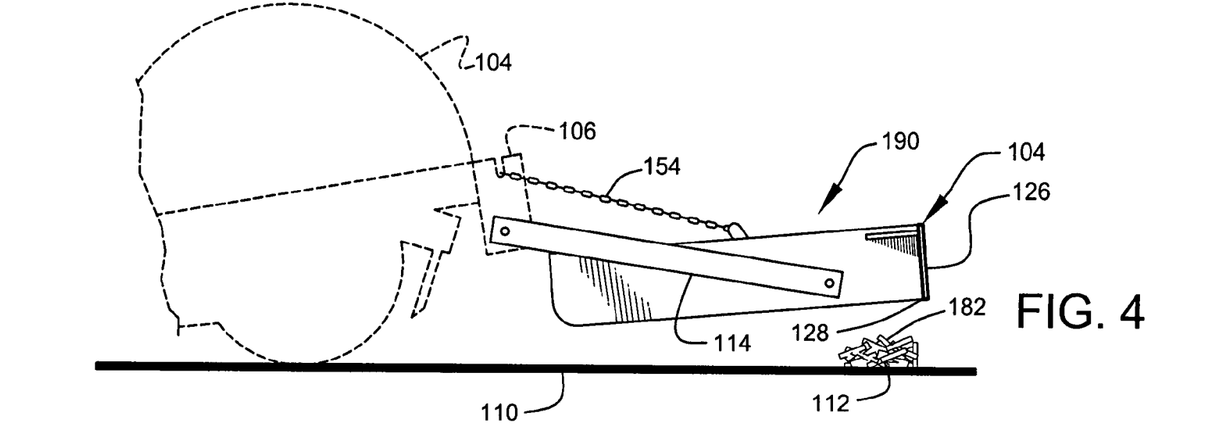
FIG. 4 shows a side view, partially in section, of the core-cleaner of FIG. 1 in a transport/core dumping position.

Preferably, one first end of each respective positioning chain 150 and 154 is attached to the core-cleaner and one second end of the positioning chain 150 and 154 is attached to a portion of the aerator machine 102 that can be raised (as shown in FIG. 3 and FIG. 4). For example, the John Deere Model No. 800 illustrated in FIG. 1 has the "Winrow" brackets attached to a hydraulically liftable portion 155 of the aerator machine 102 that lifts the core-extractor portion 157 when the aerator machine 102 is to be moved or transported and when not in use extracting cores 112. By attaching the positioning chain 150 and 154 to this liftable portion 155 the core-cleaner 104 is preferably lifted in an almost vertical manner, as shown. This arrangement at least embodies herein wherein such positioner means comprises lifter means for assisting substantially vertical lifting of such entrapper means; and at least embodies herein wherein such at least one positioner comprises at least one lifter structured and arranged to assist substantially vertical lifting of such at least one entrapper. This arrangement also at least embodies herein wherein such at least one lifter further comprises: at least two chains, each respective such at least two chains having at least one first end and at least one second end; wherein at least one first end of such at least two chains is connected to such at least one first side; wherein at least one first end of such at least two chains is connected to such at least one second side; and, wherein when each respective such second end is connected to a raise-able portion of the core-aerator machine, such at least two chains will assist substantially vertical lifting of such at least one entrapper.

Preferably, corner-braces 162 are attached at the corners 164 of the core-cleaner 104, as shown. Preferably, the corner-braces 162 are angled, are preferably metal, and are preferably welded to the core-cleaner 104, as shown. Upon reading the teachings of this specification, those with ordinary skill in the art will now understand that, under appropriate circumstances, considering such issues as economics, user preference, material selection, etc., other types of bracing and strengthening, such as thicker material, top-mounted bracing, square bracing, etc., may suffice.

Preferably, each respective first lateral sidewall 122 and second lateral sidewall 124 comprises a flared front portion 166, as shown. Preferably, the flared front portion 166 assists funneling the extracted cores 112 into the path of the core-cleaner 104, as shown (at least embodying herein wherein such entrapper means comprises funnel means for funneling the extracted cores into such entrapper means; and at least embodying herein wherein such at least one entrapper comprises at least one funnel adapted to funnel the extracted cores into such at least one entrapper).

Figure 5:
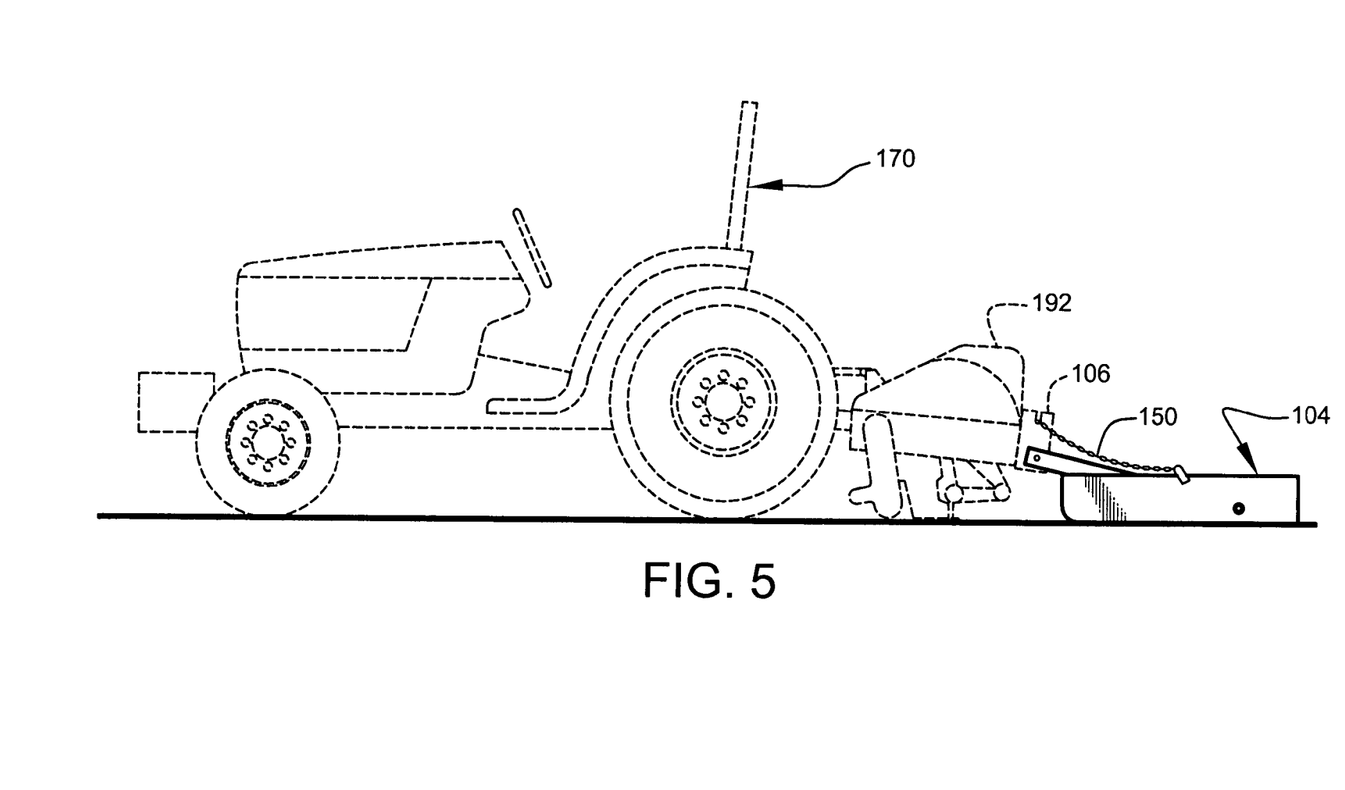
FIG. 5 shows a tractor-pulled aerator machine and core-cleaner according to another preferred embodiment of the present invention.

Preferably, each flared portion 166 comprises a radiused edge 168 to assist the core-cleaner 104 in reducing friction along the surface 110 as it is pulled across the turf by the core-aerator machine 102 or by the pulling apparatus, for example, a tractor 170, as shown in FIG. 5. This arrangement at least embodies herein wherein such at least one friction reducer comprises at least one radiused edge to reduce friction along the ground surface; and at least embodies herein wherein such funnel means comprises friction reducer means for reducing the friction of such funnel means along the ground surface. This arrangement also at least embodies herein wherein such at least one funnel comprises at least one friction reducer adapted to reduce the friction of such at least one funnel along the ground surface. Upon reading the teachings of this specification, those with ordinary skill in the art will now understand that, under appropriate circumstances, considering such issues as advances in technology, user preference, etc., other friction reducers, such as skids, low wheels, bearings, etc., may suffice.

FIG. 3 shows a side view, partially in section, of the core-cleaner 104 of FIG. 1 in an operable position 180. FIG. 4 shows a side view, partially in section, of the core-cleaner 104 of FIG. 1 in a transport/core dumping position 190. Preferably, as the core-cleaner 104 is pulled along it scrapes along the turf surface 110 and the rear lateral cross member 126 pushes the extracted cores 112 along within the U-shaped core-cleaner 104 (at least embodying herein wherein such entrapper means comprises pusher means for pushing the extracted turf cores across the ground surface; and at least embodying herein such at least one entrapper comprises at least one pusher to push the extracted turf cores across the ground surface) and simultaneously scrapes the surface 110 as the rear lateral cross-member 126 is pulled by the core-aerator machine (or tractor). The above described arrangement at least embodies herein wherein such at least one pusher comprises at least one scraper adapted to scrape the ground surface; and at least embodies herein wherein such pusher means comprises scraper means for scraping the ground surface; and further embodies wherein such at least one pusher comprises such at least one adjoining bar.

Eventually, the gathered extracted cores 112 need to be "dumped", preferably in a pile, as shown. Preferably, the positioning chain 154 is placed onto the core-cleaner 104 near the center of gravity of the core-cleaner such that when the positioning chain 154 is pulled taught by the core-aerator machine 102 "Winrow" blade brackets as the core-extractor portion 157 is lifted for transport of the core-aerator machine 102, the core-cleaner will be raised in about a parallel position to the surface 110 and the extracted cores 112 will be left in a pile 182, as shown. Further, when the core-extractor portion 157 is lowered the core-cleaner 104 is also lowered and operable to entrap the extracted cores 112, as shown. Upon reading the teachings of this specification, those with ordinary skill in the art will now understand that, under appropriate circumstances, considering such issues as economics, user preference, weight balance, core-aerator machine differences, etc., other methods of raising the core-cleaner, such as cables, offset balance weights, etc., may suffice. This arrangement at least embodies herein positioner means for assisting positioning such entrapper means in at least one lowered position and at least one raised position when connected to a raise-able portion of the turf core-aerating apparatus; wherein positioning such entrapper means in such at least one lowered position assists entrapping the turf cores; and wherein positioning such entrapper means in such at least one raised position releases the turf cores in position; and at least embodies herein at least one positioner adapted to assist positioning such at least one entrapper in at least one lowered position and at least one raised position when connected to a raise-able portion of the turf core-aerating apparatus; wherein positioning such at least one entrapper in such at least one lowered position assists entrapping the turf cores; and wherein positioning such at least one entrapper in such at least one raised position releases the turf cores in position.

FIG. 5 shows a tractor-pulled aerator machine 192 and core-cleaner 104 according to another preferred embodiment of the present invention (at least embodying herein wherein such core-aerating apparatus is structured and arranged to be pulled by a tractor). Tractor pulled aerator machines 192 tend to be much larger than self-propelled or walk-behind models and therefore core-cleaners 104 for such usage may be custom made for each application. Preferably, the basic functions and structure are similar to those described above; however, the tractor pulled aerator machines 192 tend to be significantly wider (as much as six-feet in width) and will require wider core-cleaners 104 (or multiple core-cleaners 104). Upon reading the teachings of this specification, those with ordinary skill in the art will now understand that, under appropriate circumstances, considering such issues as economics, user preference, aerator size, tractor size, etc., other core-cleaner sizes, dimensions, connections, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An aerator plug-core cleaning system, relating to ground surface collection of turf cores extracted by at least one turf core-aerating apparatus, comprising
    a) at least one entrapper adapted to entrap the turf cores;
    b) at least one connector to connect said at least one entrapper to the at least one turf core-aerating apparatus; and
    c) at least one positioner adapted to assist positioning said at least one entrapper in at least one lowered position and at least one raised position when connected to a raise-able portion of the at least one turf core-aerating apparatus;
    d) wherein said at least one entrapper comprises at least one pusher to push the extracted turf cores across the ground surface;
    e) wherein positioning said at least one entrapper in such at least one lowered position assist entrapping the turf cores; and
    f) wherein positioning said at least one entrapper in such at least one raised position releases the turf cores in position;
    g) wherein said at least one entrapper comprises a substantially bottomless, generally U-shaped entrapper having
        i) at least one first side,
        ii) at least one second side,
        iii) at least one adjoining bar between said at least one first side and said at least one second side, and
        iv) at least one open side;
    h) wherein said at least one first side and said at least one second side are about perpendicular to said at least one adjoining bar.

2. The aerator plug-core cleaning system, according to claim 1, wherein said at least one positioner comprises at least one lifter structured and arranged to assist substantially vertical lifting of said at least one entrapper.

3. The aerator plug-core cleaning system, according to claim 1, wherein said at least one positioner comprises at least one scraper adapted to scrape the ground surface.

4. The aerator plug-core cleaning system, according to claim 1, wherein said at least one entrapper comprises at least one fin el adapted to funnel the extracted cores into said at least one entrapper.

5. The aerator plug-core cleaning system, according to claim 4, wherein said at least one funnel comprises at least one friction reducer adapted to reduce the friction of said at least one funnel along the ground surface.

6. The aerator plug-core cleaning system, according to claim 1, wherein said at least one pusher comprises said at least one adjoining bar.

7. The aerator plug-core cleaning system, according to claim 1, wherein said at least one connector comprises at least one substantially rigid bar, attachable to the at least one turf core-aerating apparatus.

8. The aerator plug-core cleaning system, according to claim 7, wherein:
    a) said at least one substantially rigid bar comprises at least two substantially rigid bars; and
    b) each respective said at least one substantially rigid bar connects to a respective rear portion of the at least one turf core-aerating apparatus.

9. The aerator plug-core cleaning system, according to claim 1, wherein said at least one lifter further comprises:
    a) at least two chains, each respective said at least two chains having at least one first end and at least one second end;
    b) wherein at least one first end of said at least two chains is connected to said at least one first side;
    c) wherein at least one first end of said at least two chains is connected to said at least one second side; and
    d) wherein when each respective said second end is connected to a raise-able portion of the at least one core-aerator machine, said at least two chains will assist substantially vertical lifting of said at least one entrapper.

10. The aerator plug-core cleaning system, according to claim 5, wherein said at least one friction reducer comprises at least one radiused edge to reduce friction along the ground surface.

* * * * *

UNITED STATES PATENT AND TRADEMARK OFFICE
CERTIFICATE OF CORRECTION

PATENT NO. : 6,986,393 B1
DATED : January 17, 2006
INVENTOR(S) : Johnston, Jr. et al.

Page 1 of 1

It is certified that error appears in the above-identified patent and that said Letters Patent is hereby corrected as shown below:

<u>Column 10,</u>
Line 2, "positioner" should read -- pusher --.
Line 6, "fin el" should read -- funnel --.

Signed and Sealed this

Eleventh Day of April, 2006

JON W. DUDAS
*Director of the United States Patent and Trademark Office*